United States Patent

Trask et al.

Patent Number: 5,122,807
Date of Patent: Jun. 16, 1992

[54] MOTION-COMPENSATED DIRECTION FINDING SYSTEM

[76] Inventors: Peter M. Trask, 32 Cardinal Rd., East Lyme; Gregory J. Majewski, 59 Leitao Dr., Oakdale, both of Conn. 06370

[21] Appl. No.: 667,796

[22] Filed: Mar. 11, 1991

[51] Int. Cl.⁵ .............................................. G01S 5/02
[52] U.S. Cl. .................................................. 342/420
[58] Field of Search ....................... 342/417, 420, 355

[56] References Cited

U.S. PATENT DOCUMENTS 4,179,696 12/1979 Quesinberry et al. ............... 342/195
4,783,744 11/1988 Yueh ..................................... 342/62

Primary Examiner—Gregory C. Issing

[57] ABSTRACT

The improved direction finder of the instant invention has three orthogonal antenna elements or an array of antenna elements consisting of antennas in three dimensions. Amplitude and phase difference measurements are made on various combinations of antennas, and they are compared to a data base of antenna relationships that correspond to three dimensional angles. The spacial angle of arrival of electromagnetic signals are determined by the fit between the measured parameters and the stored relationships. This apparent direction of arrival is compensated for any motion of the antenna by an error signal representative of antenna motion with respect to inertial space. The apparent direction of arrival is thereby compensated to provide true direction of arrival determinations. The motion compensated direction finding system of the invention has especial utility for buoys released from undersea vessels released to sea surface.

13 Claims, 2 Drawing Sheets

MOTION-COMPENSATED DIRECTION FINDING SYSTEM

STATEMENT OF GOVERNMENT INTEREST

The present invention may be manufactured and used by or for the Government of the United States of America for governmental purposes without the payment of any royalties thereon or therefor.

BACKGROUND OF THE INVENTION (1) Field of the Invention

The instant invention is directed to the field of direction finders, and more particularly, to such direction finders that provide improved bearing measurements when subjected to pivoting/tilting motion as from the effects of the sea surface typically encountered on ship, submarine mast, and expendable and towed buoy deployments.

(2) Description of the Prior Art

Existing submarine direction finders are mounted on masts which are raised from the sail when the submarine is either at periscope depth or on the surface. These devices are operative to determine the direction of arrival of incident electromagnetic radiation based on antenna amplitude and phase relationships as a function of azimuth. They assume that the mast is always vertical, but ignore any errors that would be introduced by tilting/pivoting motion of the mast. Unless the sea state is high, these errors are typically small for such mast mounted direction finders. But for direction finders mounted on expendable and towed buoys and other platforms that experience tilting/pivoting motion about all three Cartesian axes, the heretofore known direction finders are subject to errors and compromised direction of arrival determinations to a degree that depends on the magnitude of the sea state and on the stability of the particular platform.

SUMMARY OF THE INVENTION

It is accordingly the principal object of the present invention to provide a direction finder that accurately determines the direction of arrival of received electromagnetic radiation notwithstanding that the platform to which the direction finder is mounted is subjected to pivoting/tilting motion such as would be encountered on a pitching and rolling buoy deployed from an undersea vessel to sea surface. In accordance therewith, antenna means having a 3-dimensional response pattern and a frame of reference are disclosed for providing a first signal representative of the apparent direction of arrival in azimuth and in elevation with respect to the frame of reference of the antenna means of an electromagnetic signal received within the 3-dimensional antenna response pattern. Inertial reference means, stable with respect to and moving with the antenna means, are disclosed for providing a second signal representative of the motion of the antenna means with respect to inertial space. Spatial angle estimator means responsive to the first and second signals are disclosed for providing a third signal representative of the direction of arrival of the electromagnetic radiation compensated for pivoting/tilting of the frame of reference of the antenna means with respect to inertial space. In one presently preferred embodiment, averaging means are provided for compensating the third signal representative of direction of arrival with respect to inertial space for noise that would otherwise be induced thereinto that is attributable both to variations in the electromagnetic properties of the sea, such as instantaneous variations in local reflectivity, as well as to variations attributable to any structural departure of the antenna means from an ideally constructed antenna.

BRIEF DESCRIPTION OF THE DRAWINGS

These and other objects, features and attendant advantages of the present invention will become apparent by referring to the following detailed description of the invention, and to the drawings, wherein.

DESCRIPTION OF THE PREFERRED EMBODIMENT

Figure 1A:
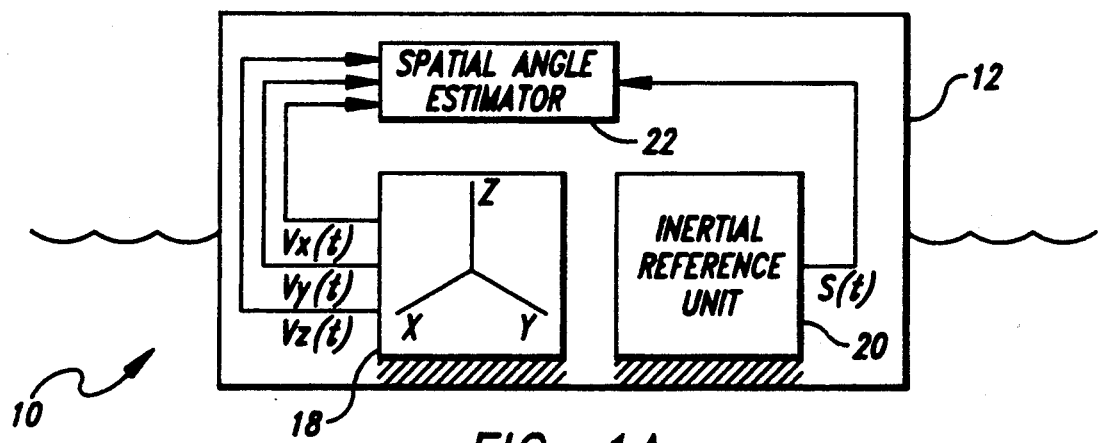
FIG. 1A is a block diagram illustrating the motion compensated direction finding system of the present invention.
Figure 1B:
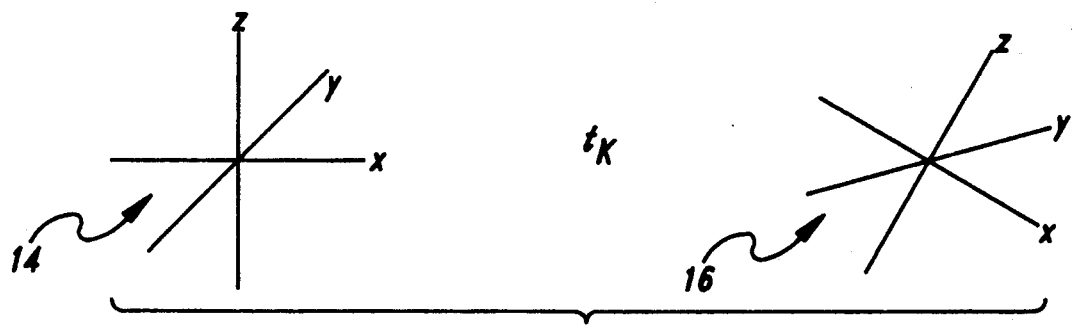
FIG. 1B illustrates graphs useful in explaining the operation of the motion-compensated direction finding system of FIG. 1A.

Referring now to FIG. 1, generally designated at 10 is a block diagram illustrating the novel motion-compensated direction finding system of the present invention. A sea-borne platform schematically illustrated by box 12, such as a submarine mast or a buoy, is moved as the sea in which it is deployed moves to a degree that depends on the sea state and the stability of the platform. The platform 12 defines a coordinate system generally designated 14. The position and orientation of the coordinate system 14 varies in the same way that the platform 12 is moved by the sea. When the platform 12 is a buoy, or a submarine mast in a very high sea state, the platform 12 tends to pitch and roll about. The coordinate system 14 defined by the platform 12 pitches and rolls about correspondingly, as schematically illustrated for one such exemplary instant by the coordinate system generally designated 16. As will be appreciated by those skilled in the art, this kind of pivoting/tilting motion of the platform 12, as schematically illustrated by the difference in orientation between the coordinate systems 14, 16, heretofore corrupted any direction of arrival determination to an extent that depended on the magnitude of the sea state and the instability of the platform.

To the platform 12 a directional antenna 18 is fixedly mounted so that it moves as the platform 12 is moved by the sea. The directional antenna 18, which may be any antenna that has a 3-dimensional response pattern in azimuth and elevation, such as microwave spiral elements disposed on three orthogonal axes, or radiowave loop antennas disposed on three orthogonal axes, among others, provides three output voltage signals designated $V_x(t)$, $V_y(t)$ and $V_z(t)$ respectively having amplitudes and phases that are representative of the contribution of received electromagnetic energy incident to the three axes of the 3-dimensional directional antenna at a particular azimuth and elevation angle defined with respect to the coordinate system 14.

An inertial reference unit 20, such as a three-axis plumb bob or a three-axis gyroscope, which unit is fixedly mounted to platform 12 (of course with the plumb bob, gyroscope rotor, or other inertial sensor element of the unit being movable relative to platform 12 as the result of the internal three-axis affixation of the sensor element within the unit). The inertial reference unit 20 is stable with respect to and moves as the antenna 18 is moved by the sea state. The inertial reference unit 20 produces an output signal designated S(t) representative of the orientation of the platform 12, in three-dimensions with respect to inertial space. The signal S(t) is an error signal that represents the angular orientation of the platform 12 and antenna 18 as they are moved to a degree that depends on the magnitude of the sea state at any given time and on the platform stability.

A spatial angle estimator 22 to be described is mounted to the platform 12 and is coupled to the antenna having a 3-dimensional response pattern 18 and to the inertial reference unit 20. As appears more fully hereinbelow, the spatial angle estimator 22 is responsive to the voltage signals Vx(t), Vy(t), and Vz(t) provided by the antenna 18 which are representative of the particular azimuth and elevation of incident electromagnetic radiation relative to the frame of reference of the antenna and is responsive to the error signal S(t) representative of the orientation of the platform 12 and antenna 18 with respect to inertial space to compensate the signals Vx(t), Vy(t), and Vz(t) representative of the apparent direction of arrival in azimuth and elevation of the incident electromagnetic radiation with respect to the coordinate system 14 for the pivoting/tilting motion of the platform 12 and antenna 18 to provide a true direction of arrival determination with respect to inertial space. It is to be understood that the foregoing term "true direction" means the orientation of radiation incident to the antenna with respect to the at rest inertial space.

Figure 2:
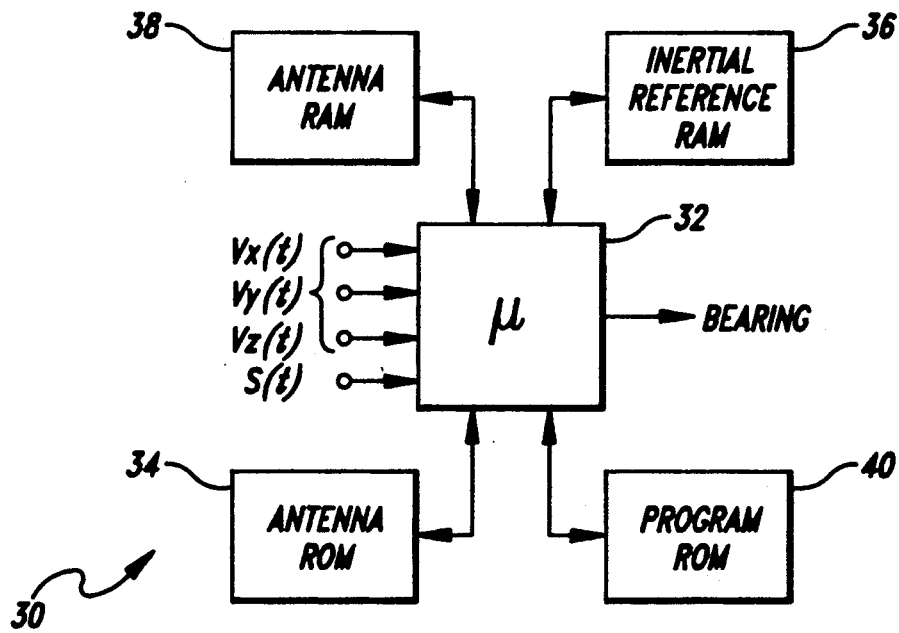
FIG. 2 is a block diagram of the spatial angle estimator of FIG. 1A.

Referring now to FIG. 2, generally designated at 30 is a block diagram illustrating the spatial angle estimator 22 (FIG. 1A) of the motion-compensated direction finding system of the present invention. The spatial angle estimator 30 includes a conventional and well known digital microprocessor 32 to which an antenna ROM 34 is operatively coupled. Although ROM is preferred, any other suitable storage element, such as battery backed RAM, EPROM, and NOVRAM may be employed. The antenna ROM 34 includes a reference data table which is representative of the Vx (ref), Vy (ref), and Vz (ref) response of the three-axis antenna 18 (FIG. 1A) and which is "parameterized" for different azimuth and elevational coordinates at which measurements are taken. In the presently preferred embodiment, the antenna ROM 34 data table is tabulated empirically for each particular antenna 18 (FIG. 1A). A radiator simulating the kind of electromagnetic source that the antenna 18 is intended to detect is controllably positioned successively at different selected sets of azimuth and elevational coordinates in the far field of each antenna. For each selected particular azimuth and elevational coordinate, the response of the antenna in Vx(ref), Vy(ref), and Vz(ref) is measured. Stated another way, what the data stored in antenna ROM 34 represents is antenna response pattern data constituting reference models of antenna 18's response to radiation sources at selected sets of azimuth and elevation coordinates relative to the antenna. The number of data points selected depends on the intended of the direction finding system. The antenna ROM 34 data table is preferably stored as a $n \times 2$ matrix, where "n" is the selected number of data points selected to provide the intended resolution, and where for each of the "n" data table entries, the particular azimuth and elevational coordinate for another set of learned voltages Vx, Vy, and Vz is associated. More particularly, the signal parameters placed in the reference data table are chosen to discriminate three-dimensional angles of incidence of arriving radiation. For example, these parameters may include amplitudes $A_1(ref)$, $A_2(ref)$ and $A_3(ref)$, and phase differences $\phi_1(ref)-\phi_2(ref)$ and $\phi_2(ref)-\phi_3(ref)$ experimentally determined for the three orthogonally related antenna elements at given aspect angles of radiation. In the preferred embodiment, the data is stored in a normalized form using the same normalization procedure adopted in normalizing the signals Vx(t), Vy(t), and Vz(t) to be described.

An inertial reference RAM 36 is operatively coupled to the processor 32. At the RAM 36 address locations, data representative of the error signal produced by the inertial reference unit 20 (FIG. 1A) is stored and recalled in a manner to be described.

An antenna RAM 38 is operatively coupled to the processor 32. The antenna RAM 38 provides memory locations at which the voltage response signals Vx(t), Vy(t), and Vz(t) of the antenna 18 (FIG. 1A) are temporarily stored in a manner to be described.

A program ROM 40 is operatively coupled to the processor 32. The program ROM 40 controls the operation of the spatial angle estimator 22 in a manner to be described.

Figure 3:
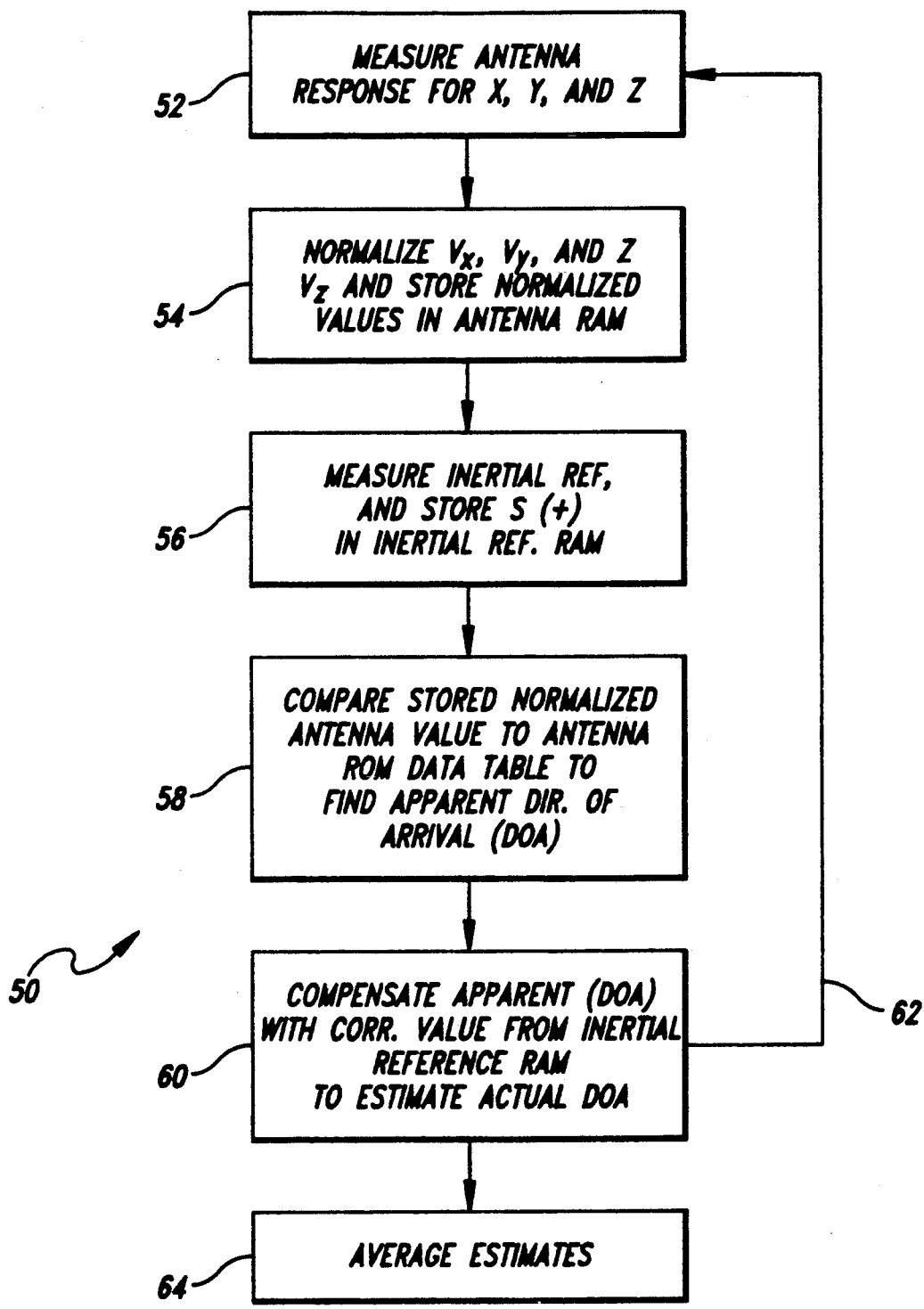
FIG. 3 is a flow chart illustrating the presently preferred sequence of processing of the spatial angle estimator of FIG. 2.

In operation, and referring now to FIG. 3, generally designated at 50 is a flow chart illustrating the presently preferred embodiment of processing flow of the spatial angle estimator of the motion-compensated direction finding system of the present invention. As shown by a block 52, the processor of the spatial angle estimator takes a measurement of the three voltages Vx(t), Vy(t), and Vz(t) produced by the three orthogonally orientated antenna elements of the antenna 18 (FIG. 1A) having a three dimensional response pattern with respect to the moving frame of reference 14 (FIG. 1A) of the antenna. More particularly, the voltage parameters measured are the same as those chosen to discriminate three-dimensional angles of incidence in connection with the reference data table stored in antenna ROM 34. The measurements are taken by any conventional sample, hold and quantize circuitry (not shown).

As shown by a block 54, the processor 32 of the spatial angle estimator 22 is operative to normalize the voltage signals Vx(t), Vy(t), and Vz(t), and stores the normalized values in the antenna RAM 38 (FIG. 2). The normalization in the preferred embodiment is accomplished by weighting the voltage signals Vx(t), Vy(t) and Vz(t) produced by the antenna 18 (FIG. 1A) at each time that measurements of its response are made by the square root of the sum of the squares of the magnitudes of these voltage signals at each measurement time, although other normalization weights, such as those produced by a linear average thereof, could be employed as well without departing from the inventive concept. The normalized voltages along the three constitutive dimensional antenna axes are stored by the processor 32 (FIG. 2) in the antenna RAM 38 (FIG. 2).

As shown by a block 56, the processor 32 (FIG. 2) of the spatial angle estimator 22 (FIG. 1A) then measures the value of the error signal S(t) being output by the inertial reference unit 20 (FIG. 1A) at each such measurement time. This S(t) error signal represents the orientation of the platform with respect to inertial space, and the value thereof is stored by the processor 32 in the inertial reference RAM 36 (FIG. 2) at each measurement time.

As shown by a block 58, the processor 32 of the spatial angle estimator then compares the stored normalized antenna values to the data prestored in the antenna ROM data table to find the entry that is closest to the measured data, preferably by executing a table look-up function under control of the ROM 40 (FIG. 2). The data prestored in the reference data table of ROM 34 has been normalized in the same manner (this has also been noted hereinabove). For that data set, the corresponding particular azimuth and elevational angle represents apparent direction of arrival of the incident electromagnetic signal with respect to the moving coordinate system 14 (FIG. IB) of the antenna means 18 (FIG. 1A).

As shown by a block 60, the processor of the spatial angle estimator is then operative to compensate the apparent direction of arrival with the corresponding value of the error signal S(t) from the inertial reference RAM 36 (FIG. 2) for that data measurement point to find the actual direction of arrival with respect to inertial space.

As shown by line 62, the above described process is then repeated a predetermined number of times.

As shown by a block 64, the estimates of actual direction of arrival computed for a predetermined number of data points are averaged to form a noise-compensated determination of the actual direction of arrival of the incident electromagnetic radiation with respect to inertial space. The step 64, although preferred, is not necessary. The averaging of a number of actual direction of arrival estimates enables the motion-compensated direction finding system of the present invention to cancel-out variations that would be introduced into the bearing estimates from variations in the sea state, such as from changing electromagnetic coefficients of reflectivity and from variations induced by non-ideal antenna response patterns.

Many modifications of the presently disclosed invention will become apparent to those skilled in the art without departing from the inventive concept.

What is claimed is:

1. A motion-compensated direction of source of electromagnetic radiation finding system, comprising:

antenna means having a three-dimensional response pattern fixedly mounted to a platform body which undergoes motion, said antenna means defining a first three-dimensional frame of reference which undergoes the same motion as the platform body, said antenna means in response to presence of a radiation source providing a first signal representative of the apparent direction of arrival of radiation incident to the antenna means with respect to the first frame of reference;

three-axis inertial reference means which is carried by said platform body, said three-axis inertial reference means defining a second three-dimensional frame of reference which is at rest with respect to inertial space irrespective of the motion of the platform body, said three-axis inertial reference means being operative to provide a second signal representative of the orientation of the first frame of reference with respect to at rest inertial space; and spatial angle estimator means coupled to the antenna means and to the three-axis inertial reference means, said spatial angle estimator means including a plurality of empirically pre-obtained reference models of the three-dimensional response pattern of said antenna means respectively due to radiation received along selected different three-dimensional angles of radiation incidence to the antenna means, said spatial angle estimator means being responsive to the plurality of reference models, the first signal, and second signal to provide a third signal representative of the true direction of arrival of said radiation incident to said antenna means with respect to at rest inertial space.

2. The invention of claim 1, wherein said antenna means is a three Cartesian axis antenna.

3. The invention of claim 2, wherein said three axis antenna includes microwave spiral elements disposed on corresponding ones of the three Cartesian orthogonal axes thereof.

4. The invention of claim 2, wherein said antenna means includes radio wave loop elements disposed on corresponding ones of the three orthogonal axes thereof.

5. The invention of claim 1, wherein said inertial reference means includes a three-axis plumb bob.

6. The invention of claim 1, wherein said inertial reference means includes a three-axis gyroscope.

7. The invention of claim 1, wherein said antenna means has antenna elements along its three constituent dimensions, said first signal being representative of the direction of arrival of radiation incident to the elements, said second signal comprising a signal S(t) representative of the three like constituent dimensions of the second frame of reference, the reference model response pattern for each selected angle of radiation comprising data representative of performance related to three like constituent dimensions, said spatial angle estimator means comprising a digital processor having operative coupled thereto an antenna RAM means for storing said first signal, an inertial reference RAM means for storing said second signal, and an antenna ROM means for storing reference model response pattern data for the different angles of radiation incidence with the organization of data storage within the antenna means ROM being such that the address locations of items of reference models response pattern data are stored as an antenna ROM means data table representative of performance of the antenna means in response to radiation received at different sets of azimuth and elevational coordinates for an aspect line between the antenna and a far field radiator, the operation of said processor being controlled by a program means for controlling the processor to utilize the signal parameters stored in the antenna RAM means and the signal parameters stored in the inertial reference RAM means and the data stored in the antenna ROM means data table to estimate the true direction of arrival of the instant radiation with respect to at rest inertial space.

8. The invention of claim 7, wherein (i) the data stored in the antenna ROM means data table comprises reference model response pattern data which is in turn comprises empirically preobtained, normalized, voltage responses of the antenna element Vx (ref), Vy (ref) and Vz (ref), (ii) an antenna RAM means data table has stored therein said first signal which in turn comprises voltage signal outputs of orthogonally related antenna elements Vx(t), Vy(t) and Vz(t), and (iii) an inertial reference means RAM data table has stored therein said second signal S(t) which in turn comprises voltage signals representative of the orientation of the first frame of reference with respect to the second frame of reference, said processor being operative to measure the voltage signals $Vx(t)$, $Vy(t)$, and $Vz(t)$, to then normalize these voltages and store the normalized values in the antenna RAM means data table, to then measure the constituent voltage signals of second signal $S(t)$ and stored the voltage values thusly measured in the inertial reference RAM means data table, to then compare the stored normalized antenna element signal output values to the antenna ROM means data table to find the apparent direction of arrival of incident electromagnetic radiation, and to then compensate the apparent direction of arrival with the corresponding values from the inertial reference RAM means data table, to thereby provide said estimate of the true direction of arrival of the instant electromagnetic radiation.

9. The invention of claim 8, wherein said processor is further operative to take an average of plural true direction of arrival estimates to compensate the voltage signals for noise that would otherwise be introduced therein from random external sources of signal perturbation that differently affect measurement of the first signal at different loci at which the measurements are obtained.

10. The invention of claim 1, wherein said platform body is a buoy.

11. The invention of claim 10, wherein said buoy is free floating.

12. The invention of claim 10, wherein said buoy is tethered for tow by a marine vessel.

13. The invention of claim 1, wherein said platform body is structure integral with a marine vessel.

* * * * *